G. M. EATON.
BATTERY BOX.
APPLICATION FILED AUG. 6, 1920.

1,399,702.

Patented Dec. 6, 1921.

Inventor
G. M. Eaton.

By Geo. P. Kimmel
Attorney

UNITED STATES PATENT OFFICE.

GEORGE M. EATON, OF BAINBRIDGE, GEORGIA, ASSIGNOR OF ONE-THIRD TO H. G. BELL, OF BAINBRIDGE, GEORGIA.

BATTERY-BOX.

1,399,702.          Specification of Letters Patent.          Patented Dec. 6, 1921.

Application filed August 6, 1920. Serial No. 401,678.

*To all whom it may concern:*

Be it known that I, GEORGE M. EATON, a citizen of the United States, residing at Bainbridge, in the county of Decatur and State of Georgia, have invented certain new and useful Improvements in a Battery-Box, of which the following is a specification.

This invention relates to battery boxes or protective casings.

The object of the invention is to provide a battery box or protector designed especially for use on Ford cars the batteries of which are now unprotected.

Another object is to so construct such a box that it may be manufactured and sold at a minimum cost and yet will afford maximum protection to the battery without necessitating any change whatever in the battery or in the standard equipment of the car.

Another object is to provide a protector of this character which will prevent sand and water from entering the battery thereby greatly increasing its efficiency and prolonging its life.

Another object is to provide such a protector in the form of a sheet metal casing having cable openings protected by insulating material to prevent short circuiting should the insulation on the cable become worn or otherwise injured.

With these and other objects in view, the invention consists in certain novel features of construction as hereinafter shown and described, and then specifically pointed out in the claims and in the drawings illustrative of the preferred embodiment of the invention.

Figure 1:
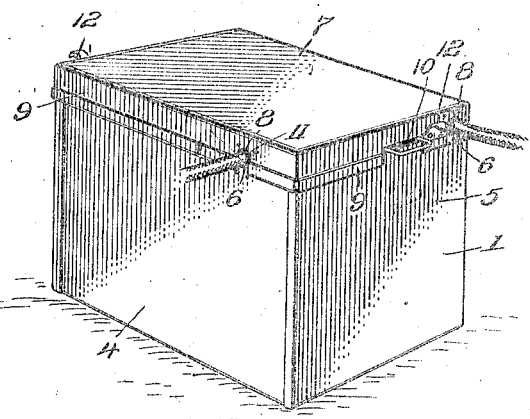
Figure 1 represents a perspective view of a battery box constructed in accordance with this invention.
Figure 2:
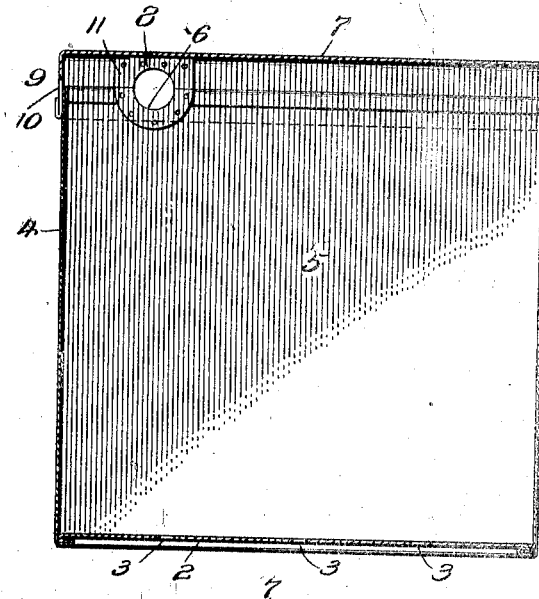
Fig. 2 is a vertical section thereof.
Figure 3:
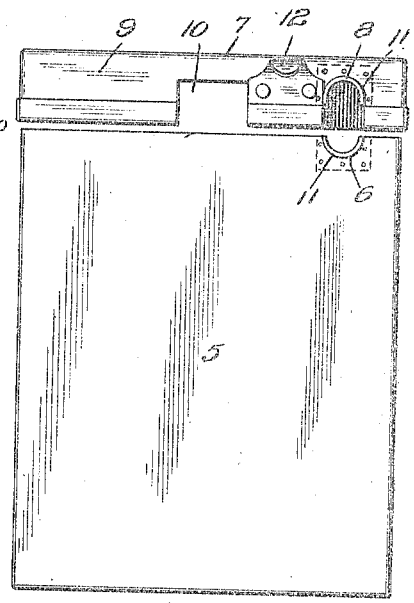
Fig. 3 is an end elevation with the cover arranged in juxtaposition ready for assembling.
Figure 4:
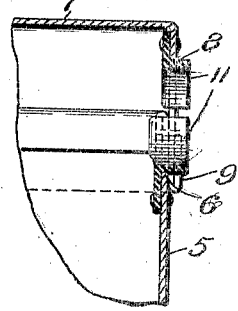
Fig. 4 is a detail sectional view.

In the latest models of the Ford roadster and touring cars the batteries are exposed and as a result of such exposure they do not give the service which they otherwise would. It is to overcome this objection that this invention is designed and as shown the protector constituting the invention comprises a box 1 shaped to conform to the shape of the battery to be protected and of a size to snugly fit such battery so that the box will occupy a minimum amount of space, in fact requiring substantially no more space than the unprotected battery. To fit the batteries now used by such cars the box should be about ten inches deep, seven and one-half inches wide and nine and three-fourths inches long, the dimensions of course being altered to fit the battery for which it is intended if it is found necessary to do so. This box 1 as here shown is rectangular in form and is composed preferably of japanned tin although it may be composed of any other sheet metal. The bottom 2 of the box is perforated as shown at 3 to permit any liquid such as the overflow from the battery to pass out of the box. The upper edges of the adjacent side and end of the box indicated at 4 and 5 have recesses 6 formed therein to receive the cables which lead from the batteries. These recesses 6 are here shown semicircular in form and are designed to register with similarly shaped recesses 8 formed in the flanges 9 of the closure 7. This closure 7 has the flanges 9 thereof depending therefrom around both its end and side edges and is adapted to snugly fit the upper end of the box and to be held frictionally in engagement therewith so that no other fastening means for the closure are necessary.

This flange 9 is also provided at diametrically opposite points with recesses 10 which are designed to permit the handles of the battery to project therethrough. The cable receiving recesses 6 and 8 are faced with a suitable insulating material shown at 11 adapted to protect the cables from the metal of the box and its closure should the insulation on the cables become worn or otherwise injured and thus prevent short circuiting.

Handles 12 are secured to the outer faces of the opposite end flanges of the closure 7 preferably at diagonally opposite points and are designed to facilitate the application and removal of the closure without interfering in any way with adjacent parts of the automobile.

From the above description it will be obvious that this box 1 may be manufactured and sold at a very low cost and when the battery is inserted therein it will be fully protected and sand or water prevented from getting into it thus increasing its efficiency and prolonging its life.

The preferred embodiment of the invention is disclosed in the drawings and set forth in the specification, but it will be understood that any modifications within the scope of the claims may be made in the construction without departing from the principle of the invention or sacrificing any of its advantages.

What I claim is:

1. A protector for batteries comprising a sheet metal box of a size and shape to snugly fit the battery in connection with which it is to be used, said box being open at its upper end and having recesses in the top edges of two of its walls, a closure for said box having a depending flange with recesses therein positioned to register with those in the box, and protective insulating means arranged around said recesses.

2. A protector for automobile storage batteries comprising a sheet metal box of a size and shape to snugly fit the battery in connection with which it is to be used, said box being open at its upper end and having recesses in the top edges of two of its walls, a closure for said box having a depending flange with recesses therein positioned to register with these in the box, and protective insulating means arranged around said recesses, the end flanges of said top having cutout portions for the handles of the battery and having handles arranged at diagonally opposite points on said flanges.

In testimony whereof, I affix my signature hereto.

GEORGE M. EATON.